M. SEIDNER.
VOLTAGE REGULATION OF DYNAMO ELECTRIC ALTERNATING CURRENT MACHINERY.
APPLICATION FILED JULY 29, 1910.
980,844.
Patented Jan. 3, 1911.
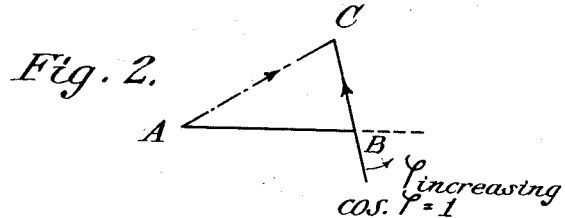
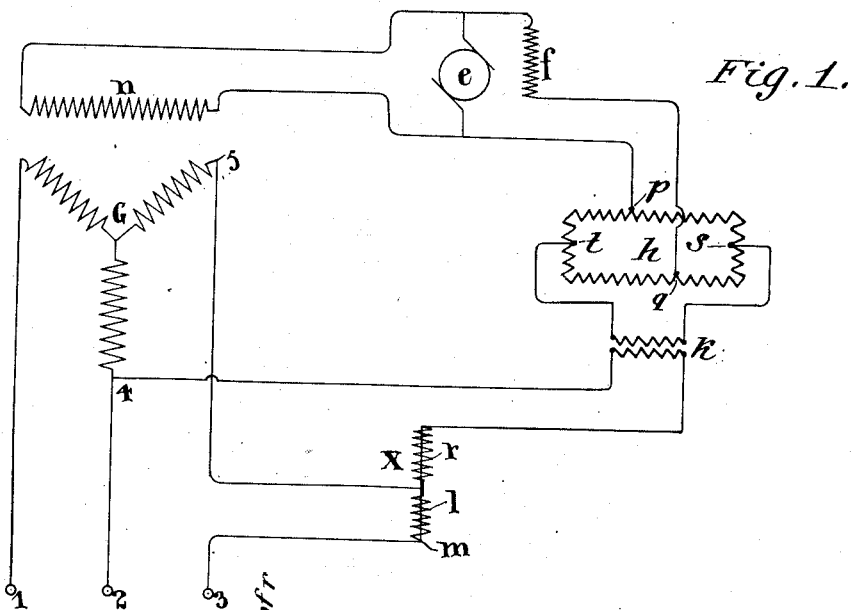
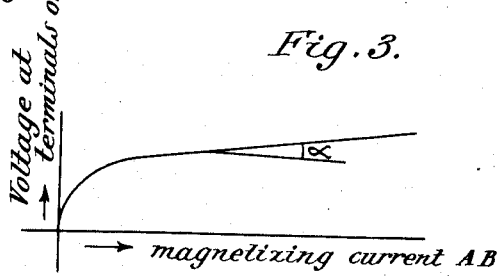
Attest,
Bent. M. Hahl.
Edward N. Sarter
Inventor,
Michael Seidner
By Spear, Middleton, Donaldson & Spear
Attys.

UNITED STATES PATENT OFFICE.

MICHAEL SEIDNER, OF BUDAPEST, AUSTRIA-HUNGARY, ASSIGNOR TO AKTIENGESELLSCHAFT BROWN BOVERI & CIE., OF BADEN, SWITZERLAND.

VOLTAGE REGULATION OF DYNAMO-ELECTRIC ALTERNATING-CURRENT MACHINERY.

980,844.  Specification of Letters Patent.  Patented Jan. 3, 1911.

Application filed July 29, 1910. Serial No. 574,585.

*To all whom it may concern:*

Be it known that I, MICHAEL SEIDNER, a subject of the King of Hungary, and residing at Zsigmondstrasse 5, Budapest 11, Austria-Hungary, have invented certain new and useful Improvements in and Relating to the Voltage Regulation of Dynamo-Electric Alternating-Current Machinery, of which the following is a specification.

This invention relates to means for regulating the voltage of dynamo electric alternating current machinery.

Regulating apparatus for alternating current generators heretofore proposed including resistances in the exciting circuit which vary their conductivity considerably with the temperature, have certain disadvantages. Many apparatus for instance require or result in involved connections. For example they require transformers with several coil divisions and terminals, which lead to unusual constructions. In other arrangements the voltage and current components of the current necessary for regulation are combined by two ordinary transformers or by a single transformer and two independent magnetic fields. In order to avoid the mutual or relative reaction of the two components to be combined and the penetration of direct current into the alternating current circuit or vice versa, special resistances must be employed or equipotential points provided by the aid of resistances. A further disadvantage of this apparatus is that the loss of energy in the ohmic resistances is too great, thus causing the efficiency of the current generator to be reduced and rendering the regulating apparatus and the working more expensive. The rapidity of the regulation with these apparatus also leaves much to be desired. As either the auxiliary ohmic resistances or the secondary coil itself of the voltage transformer are connected in parallel with the regulating resistances, the greater part of the rush of current or decrease of current momentarily produced by the current transformer in its secondary winding when a sudden variation of load occurs, flows through the parallel connected resistances or the voltage coil or is taken therefrom. The iron resistances cannot therefore effect the required sudden increase or decrease of the alternating current voltage and thus cannot effect a momentary increase or decrease of the exciting current of the exciter machine.

The object of the present invention is to obtain a regulating arrangement free of the disadvantages referred to above.

The invention consists in an arrangement in which the regulating resistances are connected together to form an independent or closed system to which direct or alternating current is supplied, and from which it is conducted away at equipotential points, the alternating current being taken from a mixed transformer in connection with the main current and the potential of the alternating current generator in such a manner that the regulating resistances so adjust themselves under the current fed to them directly or indirectly from this transformer that the voltage of the alternating current generator is maintained constant with varying load and varying phase displacement.

The invention also consists in the improvements in and relating to the regulation of alternating current dynamo electric machinery herein indicated.

Figure 1 is a diagram illustrating one manner of carrying the invention into effect. Figs. 2 and 3 are diagrams hereinafter referred to.

In this form a three-phase alternating current generator G feeds the mains 1, 2 and 3 and is excited from an exciting machine $e$, supplying the generator field winding $n$. The field $f$ of the exciter $e$ is connected to the exciter terminals by way of two points $p$ and $q$ in a resistance system denoted generally by $h$ which points represent equipotential points as regards alternating current. The resistance system $h$ is a closed system and in addition to the two connections already referred to, it has others $t$ and $s$ which are equipotential points as regards direct current and are connected to the secondary of a transformer $k$. This transformer is connected to the generator as to one side, at 4 and as to its other side is connected to one terminal of a transformer generally referred to as $x$ and including two coils $r$ and $l$ and a core $m$. In the resistance system $h$ the alternating current from the secondary of the transformer $k$ enters at the points $s$ and $t$, which are equipotentially distant from the direct current connections $p$ and $q$, whereby direct current flowing between $p$ and $q$ does not overflow into the alternating current leads. The same is true as to the alternating current and the direct current leads. The alternating current heats the regulating resistance which acts merely as a resistance element in the direct current circuit, that is, in the field circuit of the exciter $e$. If the alternating current traversing the resistance element changes, then the temperature and consequently the resistance of the element $h$ will change or vary correspondingly, and thus effect the current in the field circuit $f$, so that the excitation of the alternator will be varied in like manner. The coils $r$ at the end which is not connected with the transformer $k$ is connected to the alternating current generator, for example, at 5, so that it is excited according to the potential of the generator, and the coil $l$ is connected between the points 5 and 3 so that it is excited by the outgoing current of the generator. The number of the turns of the two coils $r$ and $l$ connected in series is such that the greater part of the terminal voltage of G is taken by $r$ so that the primary coil of $k$ receives a certain current through $r$. This current depends on the one hand on the no-load current of the mixed transformer $r\ l$ and on the other hand on the load current of the generator, as the winding $r$ creates a counter magnetomotive force which is equal but opposite in direction to the magnetomotive force of $l$. The two windings of the mixed transformer $r$ and $l$ are so connected that with a non-inductive load the component magnetomotive forces of $l$ and $r$ inclose the angle of more than 90°, while with increasing phase-displacement of the load this angle increases and the resultant current decreases. This will be seen from Fig. 2 where A. B. is the magnetomotive force of $r$ at no load. C B is the magnetomotive force of $l$ at cos. $\phi=1$. Thus the vector A C represents the resultant magnetomotive force. As the number of turns of the transformer $r\ l$ is constant this diagram also indicates the current in $r\ l$. The resultant current A C is conducted to the regulating resistances through the current transformer $k$. Thus the regulating resistances will be influenced accordingly by the voltage, current and phase-displacement of the generator.

The apparatus described above operates as follows:—When the current generator is running light, the voltage coil $r$ receives a current which corresponds to the magnetization of the transformer. This magnetization current flows through the current transformer $k$ and induces current in the regulating resistances and is sufficiently high to cause the resistance of the latter to be so adjusted under the influence of the temperature that the amount of direct current necessary for exciting the magnets $f$ of the exciter machine $e$ is automatically obtained. The current coil $l$ is without current and thus has no influence whatever on the regulation. It receives at its terminals from the winding $r$ a low induced voltage, which only influences the terminal voltage of the current generator to an unimportant degree. If load be put on the generator the load current flowing through the winding $l$ affects the winding $r$ in proportion to the increase of the load current and its phase-displacement. The regulating resistances $h$ thus receive a weaker alternating current, so that their resistance decreases, the intensity of the direct current, however, increases and the excitation of the current generator is also increased. By suitably calculating the number of ampere-turns of $l$, an over-compounding may be attained.

It is difficult to arrange the apparatus so that the regulating alternating current varies exactly to the same extent as is required by the excitation of the exciter machine to obtain a constant voltage of the generator. With different loads, therefore, a variation in voltage will always occur to some extent. To obviate this objection or to restrict it to practically negligible limits, the transformer $r\ l$ is so arranged that its iron core works at high saturation. This enables the no-load current in the coil $r$ when the terminal voltage varies, for example, slightly, to vary to a far greater extent per cent. On an increase of the voltage of the generator for example by 3%, the terminal voltage of $r$ increases 3% also, and as seen from Fig. 3, the increase of the no-load current in $r$ can by this means be made to amount to 30%, when the saturation is high enough to make tg $a=.01$. This enormous growth of the current of $r$ increases proportionally, the secondary terminal voltage of $k$ thus securing an effectual decrease in the intensity of the direct current in $f$ with a resultant reduction in the excitation of the generator G. This enables the voltage of the generator to be maintained constant within the narrowest limits. In this arrangement the current transformer $k$ acts directly only on the regulating resistances and therefore the immediate adjustment of the resistance is obtained. The rapidity of the regulation is considerably increased as compared with existing arrangements. If desired, the current transformer $k$ can be dispensed especially in the case of low-voltage generators.

Having now described my invention what I claim as new and desire to secure by Letters Patent is:—

1. In the regulation of dynamo electric machinery, a closed regulating resistance circuit having alternating current leads connected to equipotential points thereof as regards direct current and direct current leads connected to equipotential points thereof as regards alternating current.

2. In the regulation of dynamo electric alternating current machinery alternating and direct current leads, a closed regulating resistance circuit to the equipotential points as regards alternating current of which, the direct current leads are connected and to the equipotential points as regards direct current of which the alternating current leads are connected; as set forth.

3. In the regulation of dynamo electric alternating current machinery a closed circuit of regulating resistance, a generator and field coil therefor, connections for said field coil to said generator and to said regulating resistance, a source of alternating current and connections from said source to said resistance; as set forth.

4. In the regulation of dynamo electric alternating current machinery an alternating current generator, an exciter therefor, an exciting coil for the exciter, a closed resistance circuit, a connection from said exciter to the field coil of the generator, a connection from said field coil to an equipotential point as regards alternating current of said resistance circuit and a connection from said exciter to another equipotential point of the resistance circuit as regards alternating current, together with connections from equipotential points as regards direct current of said resistance circuit to a source of alternating current; as set forth.

5. In the regulation of dynamo electric alternating current machinery an alternating current generator, an exciter therefor, an exciting coil for the exciter, a closed resistance circuit, a connection from said exciter to the field coil of the generator, a connection from said field coil to an equipotential point as regards alternating current of said resistance circuit and a connection from said exciter to another equipotential point of the resistance circuit as regards alternating current, together with connections from equipotential points as regards direct current of said resistance circuit to a source of alternating current, said source including a transformer; as set forth.

6. In the regulation of dynamo electric alternating current machinery an alternating current generator, an exciter therefor, an exciting coil for the exciter, a closed resistance circuit, a connection from said exciter to the field coil of the generator, a connection from said field coil to an equipotential point as regards alternating current of said resistance circuit and a connection from said exciter to another equipotential point of the resistance circuit as regards alternating current, together with connections from equipotential points as regards direct current of said resistance circuit to a source of alternating current, said source including a transformer, and said transformer having a winding excited by a current dependent on the potential of the generator to be regulated and a winding receiving a current depending on the load of the generator; as set forth.

7. In the regulation of dynamo electric alternating current machinery an alternating current generator, a transformer comprising two coils on a common core, a connection from the generator to one coil, a connection from thence to another terminal of the generator, a connection from the other coil to the mains so that the coils are excited by a potential and a load current respectively, together with a transformer, a closed regulating resistance circuit connected to the secondary of said transformer and an exciter for the generator connected to said resistance; as set forth.

8. In the regulation of dynamo electric alternating current machinery an alternating current generator, a transformer comprising two coils on a common core, a connection from the generator to one coil, a connection from thence to another terminal of the generator, a connection from the other coil to the main so that the coils are excited by a potential and a load current respectively, together with a transformer, and a closed regulating resistance circuit connected to the secondary of said transformer with connections from equipotential points as regards alternating current to the generator field; as set forth.

In testimony whereof, I affix my signature in presence of two witnesses.

MICHAEL SEIDNER.

Witnesses:
ALEXANDER GARDAGHT,
EMIL FIRBINGERT.